United States Patent

[11] 3,615,210

| [72] | Inventors | Merrill E. Jordan<br>Walpole;<br>Allan C. Morgan, Sudbury; William G. Burbine, Whitman, all of Mass. |
|---|---|---|
| [21] | Appl. No. | 25,039 |
| [22] | Filed | Apr. 2, 1970 |
| [45] | Patented | Oct. 26, 1971 |
| [73] | Assignee | Cabot Corporation<br>Boston, Mass. |

[54] PROCESS FOR PRODUCTION OF CARBON BLACK
16 Claims, 2 Drawing Figs.

[52] U.S. Cl. ..................................... 23/209.4,
23/209.6, 23/259.5
[51] Int. Cl. ..................................... C09c 1/50
[50] Field of Search .......................... 23/209.4,
209.6, 259.5

[56] References Cited
UNITED STATES PATENTS

| 2,616,794 | 11/1952 | Krejci | 23/209.6 |
| 2,768,067 | 10/1956 | Heller | 23/209.4 |
| 2,781,247 | 2/1957 | Krejci | 23/209.4 |
| 2,851,337 | 9/1958 | Heller | 23/209.4 |
| 2,918,353 | 12/1959 | Heller | 23/209.4 |
| 3,211,532 | 10/1965 | Henderson | 23/259.5 |
| 3,235,334 | 2/1966 | Helmers | 23/209.4 |
| 3,445,190 | 5/1969 | Kallenberger | 23/209.4 |
| 3,523,759 | 8/1970 | Kidd | 23/259.5 |

Primary Examiner—Edward J. Meros
Attorneys—Kenneth W. Brown, Arthur S. Collins, Barry R. Blaker and Lawrence H. Chaletsky ABSTRACT: Process for the production of carbon black wherein a hydrocarbonaceous liquid feedstock is atomized by the injection thereof as a coherent penetrating stream transversely into an enclosed high energy gas stream produced by the combustion of a fuel and oxidant gas and thereafter conducting the thusly atomized feedstock traversely into a combustion product and/or oxygen-containing gas stream under carbon black forming conditions.

PROCESS FOR PRODUCTION OF CARBON BLACK

THE PRIOR ART

The oil furnaces process represents one of the better known and most widely practiced methods for the production of carbon black. Broadly, the process is characterized by the steps of (a) spraying a liquid hydrocarbonaceous feedstock into turbulent products of combustion produced by the reaction of a fluid fuel with an oxygen-containing gas such as air, (b) conducting the resulting reaction mixture into a carbon forming zone wherein the hydrocarbon feedstock is converted into carbon black, (c) quenching the effluent from the carbon black forming zone, and (d) collecting the carbon black product from entrainment in process gases. Further details relating to the oil furnace carbon black process may be had by reference to; U.S. Pat. Nos. 2,375,795; 2,590,660; 2,976,127; 3,009,784; 3,009,787; 3,011,872; 3,103;148; 3,206,285; 3,244,484; 3,307,911; 3,410,660 and 3,460,911.

One of the problems associated with the aforedescribed oil furnace process centers in the method by which they hydrocarbonaceous liquid feedstock is injected into the combustion product gases. As will be appreciated by those skilled in the art, the production of uniform quality oil furnace carbon black depends heavily upon the rapid dispersal of uniform droplets of the feedstock into said combustion product gases. Unfortunately, however, the physical and chemical character of the hydrocarbonaceous feedstocks commonly employed in the oil furnace process tends to mitigate heavily against the desirably uniform performance of minute droplets and subsequent dispersal thereof into the combustion product gases. Largely, for purposes of economy, the feedstocks normally employed comprise the "bottoms" or residual tars of oil refining operations. Such residual tars are generally extremely viscous and, moreover, comprise mixtures of alkyl and aryl hydrocarbon constituents of broad boiling point ranges. By virtue of their viscous nature the residual tars are extremely difficult to atomize in a uniform manner. On the other hand, due to the breadth of the boiling points of the various constituents forming part thereof, said tars are not usually amenable to treatment by vaporization techniques. Indeed, certain of the constituents of these tars have no well-defined boiling points and tend to decompose rather than vaporize when said tars are heated to above about 700° F. Thus, vaporization techniques suitable for less complex liquid materials usually fail when applied to the residual refinery tars due to premature degradation of certain constituents thereof and, of even more practical significance, such degradation phenomena often lead to deleterious coking of apparatus.

Generally speaking, prior efforts to improve the dispersal of the feedstock in the oil furnace process have been directed towards improved atomization techniques. Firstly, the heavy residual tars are often preheated to below the temperature at which severe degradation thereof occurs in order to lower their viscosity and thus allow more facile pumping and atomization thereof. Also, various atomizing nozzles are utilized which are designed so as to eject the feedstock in as optimum geometric form as possible for the particular carbon black furnace employed. Normally, the design of such nozzles provides a full or hollow cone-shaped spray. In spite of such efforts, however, problems of plugging, coking of apparatus, and uniformity of feedstock injection remain.

In accordance with the present invention, however, many of these problems previously associated with the injection of residual tar feedstocks into a carbon black producing furnace have been overcome entirely or at least substantially ameliorated.

OBJECTS OF THE INVENTION

It is a principal object of the invention to provide a novel process for the production of carbon black.

It is another object of the invention to provide a novel method for the introduction of liquid hydrocarbonaceous feedstocks into a carbon black producing environment.

It is still another object of the invention to provide a furnace type process for the production of carbon black wherein a liquid hydrocarbonaceous feedstock is atomized and injected into a carbon black forming zone in a highly efficient yet simple and substantially trouble-free manner.

It is another object of the invention to provide a furnace type process for the production of carbon black wherein residual tar feedstocks are atomized in a superior manner.

It is yet another object of the present invention to provide a process for the production of carbon black characterized by unusually high yields for given grades of carbon black.

It is yet another object of the present invention to provide novel carbon black producing apparatus.

Other objects and advantages of the present invention will in part be obvious and will in part appear hereinafter.

GENERAL DESCRIPTION OF THE INVENTION

In accordance with the present invention it has been discovered that the above and other objects and advantages are gained when an essentially hydrocarbonaceous liquid feedstock is atomized by injecting said feedstock in the form of coherent penetrating stream(s) into an enclosed high energy gas stream produced by combustion of a fuel and oxidant gas and thereafter conducting the thusly atomized feedstock substantially transversely into a combustion product and/or oxygen-containing gas stream. The thusly performed reaction mixture is maintained at carbon forming conditions, quenched and the carbon black collected as product from associated process gases.

THE DRAWINGS

DETAILED DESCRIPTION OF THE INVENTION

Figure 1:
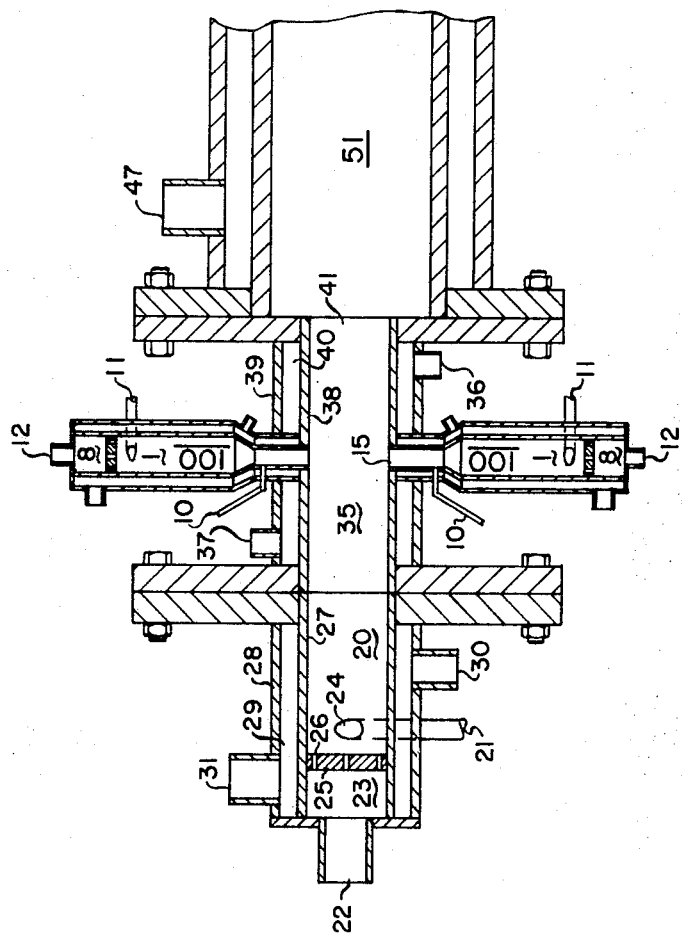
FIG. 1 is a schematic, diagrammatic longitudinal sectional view of one embodiment of apparatus suitable for the production of carbon black in accordance with the present invention.
Figure 2:
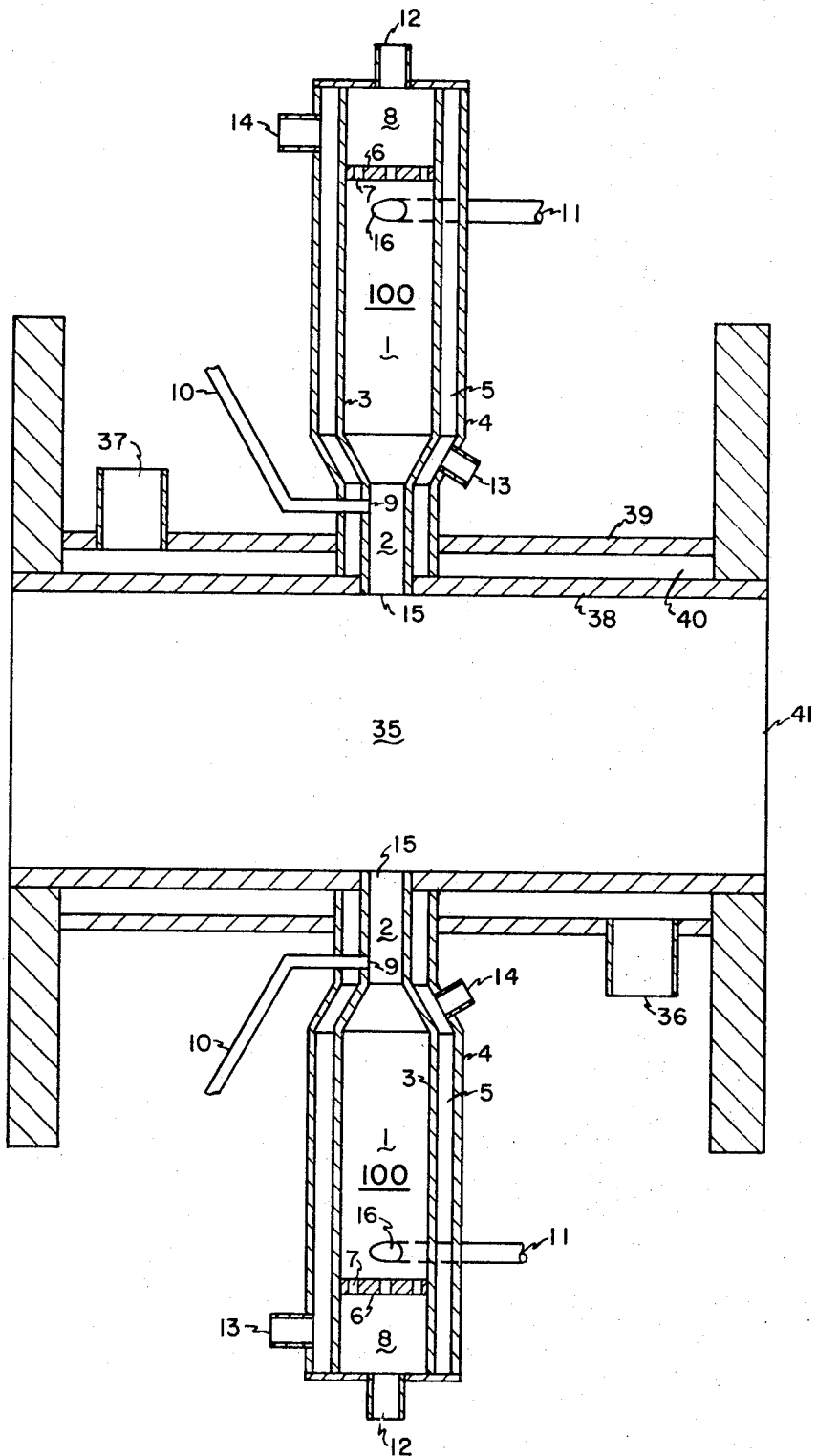
FIG. 2 is an enlarged schematic, diagrammatic longitudinal sectional view of the liquid feedstock injection mechanism of the apparatus of FIG. 1.

Referring now to FIGS. 1 and 2, combustion product and/or gas stream is provided within zone 20. When and oxygen-containing stream is employed said stream need not be heated. Normally, however, substantial direct heating thereof by virtue of combustion reaction carried out therewith will be employed. Often, therefore, zone 20 will comprise a burner as generally depicted. In combustion operation a fluid fuel, such as methane, is charged through conduit 22 into plenum 23. In those instances wherein the fluid fuel is a gas it is preferably distributed through orifices 26 of diffuser place 25 into enclosed zone 20. An oxygen-containing gas stream, such as air, is charged into said zone 20 through conduit 21 and inlet 24. Preferably, for purposes of combustion stabilization, said oxygen-containing gas stream is directed tangentially into said zone 20 so as to stabilize the combustion reaction by spinning thereof.

In this combustion reaction step the oxidant employed should be composed principally of molecular oxygen. Accordingly, air or other gases comprising at least about 20 volume percent molecular oxygen may be employed. However, it will often be preferred from the standpoints of apparatus volume efficiency and flexibility of operation that more highly concentrated oxygen-containing oxidants be employed. Thus, the oxidant stream will normally preferably comprise at least about 50 volume percent oxygen. Since industrial grades of oxygen gas of such purity are presently widely available today, and normally at oxygen concentrations of even more than about 95 percent volume, the ability to supply such high concentrations of molecular oxygen to the combustion zone will normally be readily available to the practitioner of our invention.

The fluid fuel can be any readily combustible vaporous or liquid stream (or mixtures) including such common components as $H_2CO$, $CH_4$, acetylene, alcohols, kerosene, etc.

Generally speaking, however, there is a preference for fuels with a high content of carbon-containing components, particularly hydrocarbons. For example, methane-rich streams such as natural gas and modified or enriched natural gas are excellent fuels, as are other hydrocarbon-rich streams such as various petroleum gases, liquid and refinery byproducts including $C_2$ through about $C_4$ or $C_5$ fractions, fuel oils, etc. In general, the heavier and more viscous tars and residual type oils should be used as the combustion fuel only in combination with the more concentrated or relatively pure oxygen streams and only when diluted or otherwise reduced in viscosity so as to insure vigorous and substantially complete reaction within combustion zone 1.

Generally speaking, when a combustion reaction is employed, the relative amounts of fuel and oxygen-containing gas charged into zone 20 can be adjusted so as to provide between about 50 and about 500 percent of the oxygen required for complete conversion of the fluid fuel. Obviously, when the amount of oxygen employed represents less than 100 percent of stoichiometry, the resulting combustion product stream will contain little or not molecular oxygen. However, such fuel-rich combustion reactions serve their principal purpose as a heat source for conversion of the atomized feedstock subsequently injected thereinto. When the combustion reaction is effected in a fuel-lean manner, i.e., at oxygen concentrations greater than about 100 percent of stoichiometric, the gaseous products will, of course, comprise unreacted heated oxygen which will react with a portion of the atomized feedstock subsequently injected thereinto. Preferably, the oxygen concentration will be maintained at between about 80 and about 350 percent of that required for theoretically complete reaction thereof with the fluid fuel. Temperature adjustment of the combustion reaction may be accomplished by adjusting the fuel/oxygen ratio, the fuel input or by additionally charging into the combustion zone appropriate amounts of an inert gas such as $CO_2$, $N_2$, etc.

Subsequent to the provision of a suitable combustion product and/or oxidant-containing gas stream in zone 20 as outline above, said stream is conduction through atomizate injection zone 35 wherein a liquid essentially hydrocarbonaceous feedstock atomizate is charged substantially transversely into the oxidant containing gas stream. Generally speaking, said transverse charging will be constituted by an angle of introduction of the atomizate of from about 45° in an upstream direction of about 135° in a downstream direction relative to the longitudinal axis of said zone 35. The atomization of the feedstock is accomplished within the confines of atomizers 100. While it is entirely suitable to employ only one of such atomizers 100, we must prefer that at least two such apparatuses be positioned in a manner such as to charge their respective hydrocarbonaceous atomizate products in a substantially coplanar manner into the periphery of the oxidant-containing gas stream flowing through zone 35.

In large measure the operability of the present process and the major objects and advantages accruing thereto are highly dependent upon the precise manner in which the hydrocarbonaceous liquid feedstock is converted into atomizate form and thereafter charged into the combustion product and/or oxidant-containing stream flowing through said zone 35. While two substantially opposed atomizers 100 are shown in FIGS. 1 and 2 as preferred embodiment of the invention, for the purposes of clarity and simplicity the following discussion will refer to the operations of one such atomizer, it being understood that additional atomizers will be subject to similar considerations. Detailing the atomization step, therefore, an energetic combustion reaction is effected in combustion zone 1 between a fluid fuel and an oxygen-containing gas.

The subjects of suitable fuels and oxygen-containing gases have been generally covered in our previous discussions relating to zone 20 combustion operations. Oxygen-containing gas streams comprising more than about 90 volume % $O_2$ are generally preferred as the feed oxidant in atomizer 100 operations, however.

The amount of oxygen-containing gas employed in the operation of atomizer 100 can vary substantially. In general the oxygen-containing gas should be charged into zone 1 at a rate sufficient to provide between about 50 percent and about 500 percent of the oxygen theoretically required to fully combust the fluid fuel. It will be recognized, of course, that when the amount of oxygen employed is greater than 100 percent of stoichiometric the liquid feedstock subsequently injected into the combustion gas stream will react with the excess.

The resulting combustion product gas stream is accelerated to a kinetic head of at least about 3 p.s.i. and preferably to above about 5 p.s.i. at the time said stream is conducted past feedstock injection orifice 9. Said orifice 9 comprises an unrestricted entry into zone 2 through which the essentially hydrocarbonaceous liquid feedstock is injected substantially transversely into the combustion product gas stream coursing through said zone 2. By the term "substantially transversely" is meant at an angle of from about 45° to about 135° relative to the longitudinal axis of said zone 2. Injection of the feedstock at an angle of between 45° and about 95° relative to the longitudinal axis of zone 2 is, however, preferred. While only a single orifice 9 is shown, it is to be understood that a plurality of such orifices may be positioned about zone 2 so as to result in substantially radial injection of a plurality of coherent unfragmented liquid hydrocarbonaceous feedstock streams from about the periphery of said zone 2 into the combustion product gases. When the diameter of zone 2 is greater than about 0.5 inch, it is much preferred that a plurality of such orifices by employed in order that the feedstock may be uniformly injected.

In order that the injected coherent stream(s) of liquid feedstock be fragmented or sheared rapidly and efficiently, it is important that the combustion gas stream conducted through zone 2 have an intense mass velocity. Accordingly, the development of substantial kinetic head within the combustion product gas stream of at least 3 p.s.i. is of prime importance to the success of the overall process of the present invention. Preferably, said combustion gas product stream will normally attain a kinetic head of greater than about 5 p.s.i. at the locus of injection of the feedstock.

Also, whatever the choice of number of unfragmented feedstock injection streams to be employed, in the interests of stable process performance and feedstock atomizate product quality it is of further importance that said liquid stream(s) penetrate the combustion product stream in such a manner as to not significantly contact the walls of the enclosing apparatus prior to thorough mixing thereof with the combustion gases. Obviously, performance of the above penetration criterion will depend heavily upon such parameters as, the mass velocity of the combustion gases flowing past the loci of the liquid injection (orifice 9), the geometry and dimensions of the enclosing apparatus (zone 2), the dimensions and number of the liquid injection orifice(s) 9, the rate of liquid feedstock injection employed, the liquid injection pressure utilized, etc. Accordingly, those skilled in the art will recognize that the provision of suitable penetration of the unfragmented liquid stream(s) into the hot combustion gases may be altered by appropriate control of any one or combination of several process variables including the geometry and sizing of the producing apparatus. Suffice it to say, therefore, that the penetration of the unfragmented feedstock liquid stream(s) into the combustion gases flowing through zone 2 is probably most directly (although not solely) expressed as a direct function of the ratio of the kinetic head of said combustion gases to the kinetic head(s) of the liquid feedstock stream(s). Normally, said ratio should be maintained at between about 1:3 and about 1:100 in order to maintain said desired penetration criterion. Many methods are available to the practitioner of the instant invention for ensuring that the mass velocity of the combustion product gases will possess sufficient kinetic energy to properly fracture the unfragmented jet(s) of hydrocarbonaceous liquid feedstock injected thereinto. For instance, the combustion reaction effected in zone 1 may often be controlled by the fuel or oxidant inputs thereinto to achieve, within a given apparatus, a resulting kinetic head of greater than about 3 p.s.i.g. However, it should be recognized that the design of the apparatus can also have a very profound effect upon the attained mass velocity of the combustion product gases. Thus, by conducting the combustion product gases of zone 1 through a restricted passage, such as zone 2, significant acceleration thereof can be achieved. In this particular embodiment of the apparatus, the unfragmented liquid stream(s) are injected into the restricted cross section of zone 2 wherein the mass velocity of the combustion product gases will tend to be maximized. Thus, it will be normal in the practice of the invention that the liquid hydrocarbonaceous feedstock, within about 10 milliseconds after injection thereof into the combustion gas stream, be rendered into fine atomizate form. Often, it will be found that the time required for the performance of said atomizate 14 will be substantially less, i.e., less than about 1 millisecond. This extremely rapid atomization, which is characteristic of the process of the invention, also often confers the process the ability to atomize hydrocarbonaceous liquid feedstocks such as the heavy residual tars which would normally be prematurely deleteriously altered or decomposed by the high temperature environment of the combustion gas stream.

In further consequence of the highly efficient manner in which the liquid hydrocarbonaceous feedstocks are atomized in the process of the present invention, we have further surprisingly discovered that carbon black yields, based upon total carbon inputs into the producing apparatus, are often substantially improved over essentially similar processes wherein the liquid hydrocarbonaceous feedstock is injected into the carbon forming zone by virtue of typical prior art pressure or bifluid atomization techniques. Obviously, such yield advantages can provide important further economic advantages to out process. Comparative demonstrations of this aspect of our invention are provided in the example forming part hereof.

In any case, once the injected liquid has been rapidly sheared into atomizate form, further atomization or vaporization of the liquid droplets will take place largely as a result of thermal load imposed upon said droplets by the combustion product stream associated therewith. Thus, said droplets, now cloaked in a mantle of hot combustion product gases, will often be further reduced in size or at least partially converted to the vapor state by the high temperature environment of the combustion product gas stream. Where such further reduction is desired, it will normally be further desirable that the heat release rate of the combustion reaction effected in zone 1 be at least $20 \times 10^6$ B.t.u.'s per hour per foot$^3$. of the combustion zone volume. In come instances, the heat release rate of the combustion reaction will be greater than about $1,000 \times 10^6$ B.t.u.'s/hr./ft.$^3$.

In final preparation for the actual carbon black forming step it is pointed out that an additional requirement for conversion of a hydrocarbonaceous feedstock to carbon resides in the achievement of an environmental temperature of about 2,400° F. and preferably above about 3,000° F. within the carbon forming zone. Accordingly, the total heat generated by the combustion reactions in zone 1 of atomizers 100 and zone 20 (when said zone 20 is employed as a combustion zone) should normally be sufficient to heat the reaction mixture to above about 2,400° F. This is particularly true when the molecular oxygen inputs into the system represent 100 percent of the fluid fuel combustion requirements or less. When, however, the total molecular oxygen inputs represent more than 100 percent of stoichiometric relative to the total fluid fuel inputs it will generally be possible to heat the reaction mixture to substantially less than 2,400° F. by virtue of the combustion reaction(s) and yet assure eventual attainment of this minimum temperature by reaction of a portion of the atomized liquid feedstock with this excess oxygen.

The reaction mixture formed in the feedstock mixing zone 35 depicted in FIGS. 1 and 2 is thereby placed in condition for carbon black formation. The only additional requirement resides in the provision of an enclosed carbon forming zone wherein suitable residence time is provided for the formation of the black product. This can be accomplished by discharging the said reaction mixture from downstream end 41 of said feedstock mixing zone 35 into a suitable reaction zone 51. As shown in FIG. 1 of the drawing, reaction chamber 45 is in open communication with the downstream end of said zone 35. Reaction zone 51 should be generally unobstructed and usually larger in cross-sectional area than the downstream end 41 of feedstock injection zone 35. Preferably, the upstream end of reaction zone 51 should be several times, e.g., about 4 times, as large in cross-sectional area as the downstream end 41 of feedstock injection zone 35. The desired residence time to be allowed for carbon formation under known operating conditions can obviously, therefore, be controlled by appropriate choice of length and cross-sectional area of reaction zone 51. Although the exact residence time for each case will naturally depend upon the particular reaction conditions and the carbon black product quality desired, in the present process it will usually fall in the range of from less than about 1 millisecond to several seconds, and most ordinarily within the range of from about 1 to about 100 milliseconds for most carbon black grades of major interest.

In order to provide for the termination of the carbon forming reaction, liquid spray nozzles 61 are provided at suitable locations in quench zone 55. Thus, two such spray nozzles 61 are shown in FIG. 1. In operation the quench liquid to be sprayed, usually water, is fed to said nozzle 61 by means of entry conduits 62. Since the carbon forming reaction is essentially halted by the quenching step, the mixture leaving quench zone 55 will consist of a hot aerosol of product carbon black suspended in byproduct gases. After exiting zone 55, the aerosol is subjected to the usual finishing steps of further cooling and solid particle separation and collection as commonly practiced in the furnace carbon black art.

Although chamber 45 can be of refractory construction as commonly used in most carbon black furnaces, it is preferred that substantially the entire carbon black producing apparatus of the invention be constructed of high thermal conductivity materials such as metals 2nd provided with cooling jackets 5, 29, 40, 50 and 60 in order that during operations a suitable liquid coolant, such as water, can be circulated therethrough by means of inlet and outlet ports 13 and 14, 30 and 31, 36 and 37, 46 and 47 and 56 and 57.

There follows an illustrative nonlimiting example.

EXAMPLE

Apparatus of the type shown in FIGS. 1 and 2 is employed. Important dimensions thereof follow:

ATOMIZERS 100 (EACH)

| | | |
|---|---|---|
| I.D., zone 35 | 0.813 | inch |
| overall length (flange to flange) | 6 | inches |
| diameter, orifice 15 | 0.25 inch | |
| distance, orifice 15 to downstream end 41 0268 | 1.5 | inches |

ATOMIZERS 100 (EACH)

| | | |
|---|---|---|
| I.D., zone 1 | 0.375 | inch |
| diameter, zone 2 | 0.25 | inch |
| overall length (plate 6 to orifice 15) | 2.6 | inches |
| length, zone 2 | 1.25 | inches |
| diameter, orifice 9 | 0.025 | inch |
| distance, orifice 9 to orifice 15 | 1.0 | inch |
| distance, center to center, plate 6 to inlet 16 | 0.5 | inch |

ZONE 45

See table I

ZONE 55

| | | |
|---|---|---|
| overall length, flange to flange | 6 | inches |
| distance, quench nozzles 61 to upstream flange | 3 | inches |

Table I below sets forth process variables employed for each run of a series of carbon black producing runs as well as yield, surface area and scale properties of the resulting blacks. Runs Nos. 14 and 15 represent a departure from the scope of the present invention in that the liquid feedstock is injected by conventional pressure atomization technique into the oxidant-containing gas stream flowing through zone 35. Accordingly, in said Runs Nos. 14 and 15 atomizers 100 are removed entirely and replaced by conventional atomizing nozzles. The results of these runs, when compared against the results of Runs 13 and 14 wherein similar blacks are produced delineate the yield improvements over conventional atomization technique accruable to the practice of the present invention.

In all runs oxygen is employed as the oxidant gas, methane as the fluid fuel and nitrogen as the inert diluent.

The liquid feedstock, which is introduced through orifices 9, is a residual tar obtained from the catalytic cracking cycle of a petroleum refinery and having the following characteristics:

| | |
|---|---|
| API Gravity at 60° F. (ASTM-D-287) | −4.5 |
| Specific Gravity 60/60F (ASTM-D-287) | 1.092 |
| Viscosity, SSU at 130° (ASTM-D-88) | 5162 |
| Viscosity, SSU at 210° (ASTM-D-88) | 61.4 |
| Carbon Content, wt. percent | 90.87 |
| Hydrogen content, wt. percent | 7.40 |
| sulfur content, wt. percent | 1.98 |

In table I following, the yield of carbon black arising from each of the runs is expressed in terms of percent Carbon Efficiency. This parameter is determined by comparison of the total weight of carbon inputs into the apparatus against the weight of carbon black collected. Thus, the appropriate function is expressed as follows:

$$\text{Percent carbon efficiency} = \frac{\text{carbon black collected}}{\text{total carbon inputs (expressed as elemental carbon)}} \times 100$$

The capability of the present process to operate successfully over a wide range of conditions while producing a wide variety of blacks (including exceptionally fine particle sized grades) at unexpectedly high yields has been demonstrated by the above example. However, it should be kept in mind that for the most part these Runs represent only preferred portions of the entire operable range of most variables, and the possibility of operating our invention within the operable ranges taught herein but outside the preferred portions thereof actually illustrated by working examples will be obvious to those skilled in the art.

Thus, it will be obvious, for example, that substantially and essentially hydrocarbonaceous liquid feedstock can be used as the major raw material in our process provided that it is first atomized by substantially transverse injection thereof as coherent unfragmented jet(s) into a combustion product stream having a kinetic energy equivalent to at least 3 p.s.i. of pressure and is thereafter injected substantially transversely into the combustion product and/or oxidant-containing stream. Likewise, as mentioned previously, many different combinations of oxygen-containing gases and fluid fuels can be used in the combustion steps of the process.

The carbon blacks producible by the process of the present invention are useful in many applications. Included, of course, are the well known classic applications of carbon blacks in general as reinforcing agents, fillers, pigments, ultraviolet-light stabilizers, etc. for various rubber, plastic, paint, enamel, lacquer and ink compositions and the like.

Also, the carbon blacks of the invention may be after treated in order to better befit them for their intended end uses. For instance, these blacks may be wet or dry pelleted; partially oxidized by treatment with ozone, air, mineral oxacids and the like under suitable conditions; graphitized by heat treatment thereof; steam treated; fluid energy milled or subjected to other conventional treatments known in the carbon black producing arts.

TABLE I

| | Zone 20 | | | | Atomizers 100 total inputs to both | | | Kinetic head of combustion gases through zone 2 (p.s.i.a.) | Liquid feedstock rate (lbs./hr.) | Kinetic head of feedstock through orifice 9 (p.s.i.a.) |
|---|---|---|---|---|---|---|---|---|---|---|
| Run No. | Fuel rate (ft.³/hr.) | Oxygen rate (ft.³/hr.) | Oxygen/ fuel ratio (percent) | Inert diluent N₂ (ft.³/hr.) | Fuel rate (ft.³/hr.) | Oxygen rate (ft.³/hr.) | Oxygen/ fuel ratio (percent) | | | |
| 1 | 540 | 1,620 | 150 | 780 | 85 | 330 | 190 | 15 | 143 | 125 |
| 2 | 475 | 1,700 | 180 | 790 | 150 | 300 | 100 | 15 | 143 | 125 |
| 3 | 325 | 1,400 | 213 | 800 | 300 | 600 | 100 | 35 | 170 | 140 |
| 4 | 233 | 1,400 | 300 | 800 | 150 | 240 | 80 | 14 | 134 | 106 |
| 5 | 350 | 1,120 | 160 | 800 | 150 | 480 | 160 | 20 | 124 | 81 |
| 6 | 475 | 1,400 | 148 | 800 | 150 | 600 | 200 | 33 | 156 | 107 |
| 7 | 475 | 1,400 | 148 | 800 | 150 | 600 | 200 | 31 | 135 | 109 |
| 8 | 475 | 1,400 | 148 | 800 | 150 | 600 | 200 | 23 | 160 | 128 |
| 9 | 325 | 1,400 | 216 | 800 | 300 | 600 | 100 | 29 | 166 | 122 |
| 10 | None | 1,500 | (¹) | 800 | 375 | 600 | 80 | 32 | 138 | 68 |
| 11 | None | 1,500 | (¹) | 800 | 440 | 700 | 80 | 38 | 185 | 137 |
| 12 | 438 | 1,400 | 160 | 800 | 187 | 600 | 160 | 25 | 166 | 125 |
| 13 | 325 | 1,400 | 213 | 800 | 300 | 600 | 100 | 30 | 166 | 120 |
| 14 | 625 | 2,030 | 160 | 790 | (²) | (²) | (²) | (²) | 146 | 122 |
| 15 | 645 | 2,000 | 155 | 790 | (²) | (²) | (²) | (²) | 128 | 116 |

| | Carbon forming zone 45 | | | |
|---|---|---|---|---|
| | Diameter-length (inches) | Residence time taken from orifices 15 to quench nozzles 61 (milliseconds) | Product properties | |
| Run No. | | | Percent carbon efficiency | Surface area, M²/gm. | Scale |
| 1 | 2-12 | 2.6 | 30.5 | 121 | 80 |
| 2 | 2-12 | 2.6 | 28.9 | 124 | 80 |
| 3 | 2-12 | 2.7 | 25.4 | 131 | 80 |
| 4 | 2-12 | 3.4 | 28.0 | 148 | 82 |
| 5 | 2-12 | 3.7 | 28.5 | 156 | 81.5 |
| 6 | 2-24 | 5.5 | 36.6 | 310 | 76.5 |
| 7 | 2-24 | 6 | 26.2 | 428 | 73 |
| 8 | 3-24 | 12.8 | 48.8 | 124 | 82 |
| 9 | 3-24 | 12.9 | 46.2 | 129 | 82 |
| 10 | 2-6 | 2.2 | 36.1 | 137 | 83.5 |
| 11 | 2-6 | 1.8 | 39.2 | 126 | 80 |
| 12 | 2-12 | 2.6 | 51.2 | 178 | 81 |
| 13 | 2-24 | 6.0 | 47.2 | 154 | 80.5 |
| 14 | 1-48 | 2.5 | 44.0 | 162 | 81 |
| 15 | 2-24 | 5.0 | 39.5 | 161 | 78.5 |

¹ Not applicable.
² Not applicable; pressure atomized.

What is claimed is:

1. A process for producing carbon black which comprises:
   A. providing an enclosed gas stream comprising combustion product gases, oxygen or mixtures thereof;
   B. providing at least one feedstock atomizate-containing stream by
      i. combusting a fluid fuel with an oxygen-containing gas in an enclosed zone and accelerating the resulting combustion product gas stream to a kinetic head of at least about 3 p.s.i., said oxygen-containing gas comprising at least about 20 volume percent molecular oxygen and the amount thereof employed being sufficient to provide between about 50 and about 500 percent of the molecular oxygen required to react with said fluid fuel, and
      ii. injecting substantially transversely into said accelerated combustion product gas stream at least one unfragmented coherent penetrating stream of an essentially hydrocarbonaceous liquid feedstock at a rate sufficient to provide a kinetic head ratio between said combustion product gas stream and each said liquid feedstock stream of between about 1:3 and about 1:100;

C. conducting each said atomizate stream of (B) substantially transversely into the periphery of said gas stream of (A) at a rate and under conditions so as to assure, within the resulting mixture, the attainment of a temperature of at least about 2,400° F. and the creation of carbon forming conditions, and D. quenching the resulting reaction mixture sufficiently downstream of said atomizate injection step of (C) to assure sufficient residence time under said carbon forming conditions for carbon particle formation to occur.

2. The process of claim 1 wherein said enclosed gas stream provided in (A) is an oxygen-containing gas stream comprising at least 20 volume percent oxygen.

3. The process of claim 1 wherein said enclosed gas stream provided in (A) is produced by combustion of a fluid fuel with an oxygen-containing gas.

4. The process of claim 3 wherein the amount of oxygen-containing gas employed for the combustion of the fluid fuel provides between about 80 and about 350 percent of the molecular oxygen required for complete combustion thereof.

5. The process of claim 3 wherein the fluid fuel employed comprises methane.

6. The process of claim 1 wherein the oxygen-containing gas employed in step (i) comprises more than about 90 volume percent molecular oxygen.

7. The process of claim 1 wherein the fluid fuel employed in step (i) comprises methane.

8. The process of claim 1 wherein the combustion product gas stream of step (i) is accelerated to a kinetic head of greater than about 5 p.s.i.

9. The process of claim 1 wherein the essentially hydrocarbonaceous feedstock employed is a residual refinery tar.

10. The process of claim 1 wherein the step (ii) the liquid feedstock is injected into said combustion product gas stream at an angle of between about 45° upstream to about 95° downstream thereto.

11. The process of claim 1 wherein in step (ii) the liquid feedstock is injected into said combustion product stream as a plurality of coherent unfragmented jets.

12. The process of claim 1 wherein the heat release rate of said combustion reaction of step (i) is greater than about $20 \times 10^6$ B.t.u.'s/hr./ft.$^3$ of combustion zone volume.

13. The process of claim 1 wherein the heat release rate of said combustion reaction step (i) is greater than about $1,000 \times 10^6$'s/hr./ft.$^3$ of combustion zone volume.

14. The process of claim 1 wherein the resulting reaction mixture formed in step (C) attains a temperature of above about 3,000° F.

15. The process of claim 1 wherein the residence time between step (C) and (D) is between about 1 and about 100 milliseconds.

16. The process of claim 1 wherein a plurality of feedstock atomizate-containing streams are formed in step (B).